US010246857B2

(12) United States Patent
Ladron Jimenez (10) Patent No.: US 10,246,857 B2
(45) Date of Patent: Apr. 2, 2019

(54) DISTRIBUTING, OPENING AND CLOSING DEVICE FOR TAPS

(71) Applicant: GRIFERIAS GROBER, S.L., Saragossa (ES)

(72) Inventor: Roberto Ladron Jimenez, Saragossa (ES)

(73) Assignee: GRIFERIAS GROBER, S.L., Saragossa (ES)

( * ) Notice: Subject to any disclaimer, the term of this patent is extended or adjusted under 35 U.S.C. 154(b) by 0 days.

(21) Appl. No.: 15/124,247

(22) PCT Filed: Mar. 9, 2015

(86) PCT No.: PCT/ES2015/070163
§ 371 (c)(1),
(2) Date: Sep. 7, 2016

(87) PCT Pub. No.: WO2015/136133
PCT Pub. Date: Sep. 17, 2015

(65) Prior Publication Data
US 2017/0016215 A1 Jan. 19, 2017

(30) Foreign Application Priority Data
Mar. 14, 2014 (ES) .................................. 201430357

(51) Int. Cl.
*F16K 11/074* (2006.01)
*F16K 25/00* (2006.01)
(Continued)

(52) U.S. Cl.
CPC .................. *E03B 7/08* (2013.01); *E03C 1/04* (2013.01); *F16K 11/074* (2013.01);
(Continued)

(58) Field of Classification Search
CPC ...... E03B 7/08; F16K 11/074; F16K 11/0856; F16K 25/005; Y10T 137/86638
See application file for complete search history.

(56) References Cited

U.S. PATENT DOCUMENTS 4,523,604 A * 6/1985 Hutto ...................... E03C 1/04
                                                     137/102
7,261,117 B2 * 8/2007 Mork ................... F16K 11/0743
                                                     137/1

FOREIGN PATENT DOCUMENTS

CN          103267144 A        8/2013
DE             3621659 A1      1/1988
(Continued)

*Primary Examiner* — Eric Keasel
*Assistant Examiner* — Kevin R Barss
(74) *Attorney, Agent, or Firm* — Notaro, Michalos & Zaccaria P.C.

(57) ABSTRACT

Distributing, opening and closing device for taps, has an inlet chamber, an outlet chamber to the shower column/head or to the shower hose, an outlet chamber to the shower hose or the shower column/head, a discharge opening and a water regulator with the functions of opening, intermediate closing and closing/discharging in one single mechanism, the water regulator being connected to the chambers of the distributing device, and being regulated via an actuating control with several positions, diverting the water, depending on the actuating rotation, to the corresponding chamber or discharge opening of both, thus releasing the water retained in the feed pipes in order to eliminate uncontrolled discharges of water, dripping or the formation of bacteria that are commonly generated in stagnant water, such as legionella.

10 Claims, 8 Drawing Sheets

(51) Int. Cl.
  *E03B 7/08* (2006.01)
  *F16K 11/085* (2006.01)
  *E03C 1/04* (2006.01)
  *E03C 1/02* (2006.01)

(52) U.S. Cl.
  CPC .......... *F16K 11/085* (2013.01); *F16K 25/005* (2013.01); *E03C 1/025* (2013.01); *E03C 2201/30* (2013.01); *Y10T 137/86638* (2015.04)

(56) References Cited

FOREIGN PATENT DOCUMENTS

| EP | 0191577 A1 | 8/1986 |
| ES | 201030360 U | 4/2010 |
| ES | 201430102 | 1/2014 |
| KR | 20120050600 A | 5/2012 |

\* cited by examiner

DISTRIBUTING, OPENING AND CLOSING DEVICE FOR TAPS

OBJECT OF THE INVENTION

The present description relates, as its title indicates, to a distributing, opening and closing device for taps, characterised in that it comprises an inlet chamber, an outlet chamber to the shower column/head or to the shower hose, an outlet chamber to the shower hose or to the shower column/head, a discharge opening and a water regulator, having opening, intermediate closing and closing/discharging functions in a single mechanism, said water regulator being connected to the chambers of the distributing device and being regulated via an actuating control with several positions, to divert water, according to the actuating rotation, to the corresponding chamber or discharge, in conjunction with the ceramic discs incorporated in it.

The object of the invention is to achieve the release of water retained in water pipes to any shower system, be it a column, flexible hose or internal or external pipe, of those normally used to channel water towards a shower head, in order to eliminate, after using the tap, uncontrolled discharge of water, dripping and the proliferation of bacteria of those commonly generated in stagnant water, such as legionella.

BACKGROUND OF THE INVENTION

In current water pipes fitted on the taps of shower columns, shower heads, shower hoses and systems with embedded pipes, there is the drawback that when the inflow of water is closed, a small volume of water is retained in them, which can cause the proliferation of bacteria and other microorganisms that develop quickly when there is a high degree of humidity.

Another drawback arising with shower heads is that water is retained inside them in equilibrium with the atmospheric pressure; after a time a discharge of water occurs, falling into the shower area, possibly causing discomfort to users.

At present there are devices on the market to eliminate the water retained in sanitary installations, specifically in shower pipes, such as, for example the discharging device applicable to shower taps and similar, presented in Spanish utility model U201030360, in which a device is described, consisting of at least one connector with at least one radial perforation, said connector being inserted on the connection between each one of the intermediate pipes and a main body of the tap, while at the same time said intermediate pipe ends in a shower head, in such a way that when the tap that supplies the intermediate pipe and the shower head is turned off, the water retained inside of said intermediate pipe is discharged passively through the radial perforation in the connector, with the drawback that said device is located on the sanitary installation, creating dead spots without discharging between the taps and the connectors intended for discharging.

Another solution envisaged for evacuating water is found in Spanish utility model U201430102 in which an automatic discharging device is described but which is only intended for timer taps.

DESCRIPTION OF THE INVENTION

In order to solve the existing problems, a distributing, opening and closing device for taps has been devised, characterised in that it comprises an inlet chamber, an outlet chamber to the shower column/head or to the shower hose, an outlet chamber to the shower hose or to the shower column/head, a discharge opening and a water regulator that incorporates the functions of opening, intermediate closing and closing/discharging in a single mechanism, said water regulator being connected to the chambers of the distributing device and regulated via an actuating control with several positions to divert water, according to the actuating rotation, to the corresponding chamber or discharge opening of both chambers of the distributing, opening and closing device for taps.

The water regulator comprises an inlet pipe, an outlet pipe to the shower column/head or the shower hose, an outlet pipe to the shower hose or the shower column/head, a discharge pipe and ceramic discs.

The water regulator is positioned in connection with the output chambers and the discharge opening of the distributing device, regulating, via the actuating control, the direction of the water to the corresponding chamber or discharge opening, according to the actuating rotation, in conjunction with the ceramic discs incorporated in it, obtaining the opening and separate intermediate closing of each of the outlets of the shower/head and/or to the shower hose and the closing/discharging of both, in a single mechanism.

The water regulator incorporates, in a single mechanism, the functions of opening, intermediate closing and closing/discharging, furthermore ensuring that any residual water tends to evaporate quickly as the pipes are in contact with the air thanks to the channelling out through the discharge opening.

In a preferred development, the ceramic discs comprise a fixed part and another rotating part, the fixed part being configured with several straight through-openings arranged around the external diameter of the same, positioning, in the top semicircle, an opening intended for discharging and positioned on either side, an elongated opening, one intended for the outlet of the flexible hose and the other for the shower column/head, positioning in the bottom semicircle an elongated opening of larger dimensions, that takes up a large part of the semicircular surface, intended for the water inlet.

The rotating part of the ceramic discs comprises an elongated cavity, configured around the external diameter of the same, positioned in the top semicircle, intended for controlling the water flow in conjunction with the openings on the fixed part.

Said configuration is that of a preferred design but it would be equally valid to employ alternative known designs in ceramic disc closing systems which, with different configurations, would allow the same behaviour.

Opening towards the shower column/head: when the actuating control is positioned in the function for opening the outlet pipe to the shower column/head or the shower hose, the inlet chamber is connected to the outlet chamber of the distributing device, via the inlet and outlet pipes of the water regulator.

Intermediate closing: when the actuating control is positioned in the function of intermediate closing of the outlet pipe to the shower column/head or the shower hose, the connection between the inlet chamber and the outlet chamber of the distributing device is closed, for example, in a situation in which the user turns off the water flow in order to soap up.

Closing/discharging: when the actuating control is positioned in the function of closing/discharging the outlet pipe to the shower column/head or the shower hose, the discharge pipe of the water regulator remains open so that the water retained in the shower column/head and/or shower hose can flow out by gravity through a discharge opening, for example in a situation in which the user finally turns off the flow.

Opening towards the shower hose: when the actuating control is positioned in the function for opening the outlet pipe to the shower hose or the shower column/head, the inlet chamber is connected to the outlet chamber of the distributing device, via the inlet and outlet pipes of the water regulator.

Intermediate closing: when the actuating control is positioned in the function of intermediate closing of the outlet pipe to the shower hose or the shower column/head, the connection between the inlet chamber and the outlet chamber of the distributing device is closed via the inlet and outlet pipes of the water regulator, for example in a situation in which the user turns off the water flow in order to soap up.

Closing/discharging: by positioning the actuating control in the function of closing/discharging the outlet pipe to the shower column/head or the shower hose, the discharge pipe of the water regulator remains open so that the water retained in the shower column/head and/or shower hose can flow out by gravity through a discharge opening, for example in a situation in which the user finally turns off the flow.

The water regulator ensures the opening and closing of the controlled water flow and the discharging function, releasing the water retained in the shower/head or shower hose feed pipes, thus eliminating dripping, uncontrolled discharges and the proliferation of bacteria that are commonly generated in stagnant water, such as legionella.

The water regulator with two outlets can be fitted on a tap with one single outlet chamber, towards a shower column/head or towards a shower hose, without altering its operation, being regulated in this case, by an actuating control with three positions, opening, intermediate closing and closing/discharging.

In any event, throughout this description we shall refer to the two most common outlets (shower column/head and shower hose), but it can be applied to others, such as pipes to any other type of showers, or embedded pipe systems.

ADVANTAGES OF THE INVENTION

The distributing, opening and closing device for taps that is presented, affords numerous advantages over those currently available, the most important being that it is formed by an inlet chamber, an outlet chamber to the shower column/head or to the shower hose, an outlet chamber to the shower hose or to the shower column/head, a discharge opening and a water regulator which incorporates the functions of opening, intermediate closing and closing/discharging in one single mechanism.

Another of the most important advantages is that, as the water regulator incorporates, in a single mechanism, the functions of opening, closing and discharging, it also allows the residual water to evaporate quickly as the pipes are in contact with the air due to the channelling out through the discharge opening.

Another important advantage is that the water regulator is configured with an inlet pipe, two outlets, one to a shower column/head and another to a shower hose, and a discharge pipe, being regulated by an actuating control with three positions, said water regulator incorporating the functions of opening and separate intermediate closing of each of the outlets and closing/discharging of both.

A further important advantage is that, with the opening function, the controlled water flow enters via the tap chambers connecting to the inlet pipe of the regulator, being diverted, depending on the direction of rotation, directly towards the outlet pipe of the shower column/head or the shower hose.

Another important advantage derived from the previous one is that, with the closing function, the inflow of water is closed, remaining retained, depending on the direction of rotation, in the shower column/head or shower hose.

Moreover, an important advantage derived from the previous ones, is that, with the discharging function, the water retained in the shower column/head or shower hose is discharged by gravity through the discharge pipe of the regulator, coming out through an opening incorporated in the tap casing.

And lastly, an important advantage is that the water regulator, configured with two outlets, in an alternative embodiment can be fitted on a tap configured with only one outlet, for either a shower column or shower hose.

DESCRIPTION OF THE FIGURES

To provide a better understanding of this addition, a preferred practical embodiment of it is shown in the drawing attached.

In said drawing.

In the graphic representation of the distributing, opening and closing device for taps, a control knob has been used but it could have been represented by any other known type of control.

PREFERRED EMBODIMENT OF THE INVENTION

The distributing, opening and closing device for taps which is presented is characterised in that it comprises an inlet chamber (2), an outlet chamber (3) to the shower column/head (8) or to the shower hose (9), an output chamber (4) to the shower hose (9) or the shower column/head (8) a discharge opening (5) and a water regulator (6) which incorporates the functions of opening, intermediate closing and closing/discharging in a single mechanism, said water regulator (6) being connected to the chambers (1-1.1) of the distributing device, and being regulated via an actuating control (7-7.1) with several positions, depending on the actuating rotation, to divert the water to the corresponding chamber (3-4) or the discharge opening (5) of both.

The water regulator (6) comprises an inlet pipe (2.1), an outlet pipe (3.1) to the shower column/head or the shower hose, an outlet pipe (4.1) to the shower hose or the shower column/head, a discharge pipe (5.1) and ceramic discs (10).

Figure 1:
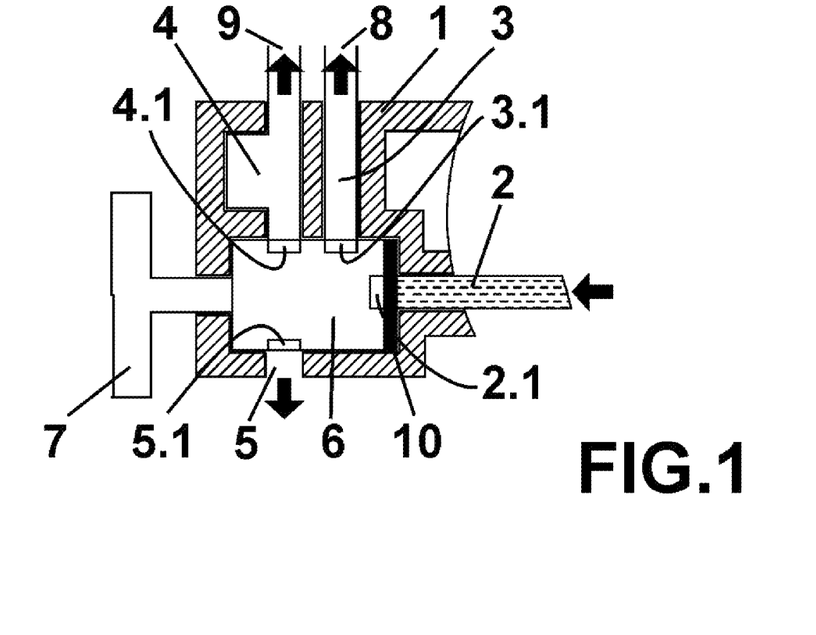
FIG. -1- shows a schematic sectional view of the distributing, opening and closing device for taps.

FIG. 1 shows the inlet chamber (2), two outlet chambers (3 and 4) and discharge opening (5) and a water regulator (6) with the functions of opening, intermediate closing and closing/discharging in a single mechanism and connected to the chambers (3-4 and 5) of the distributing device (1), being regulated via an actuating control (7) with several positions to divert water, according to the actuating rotation, to the corresponding chamber or discharge.

Figure 3:
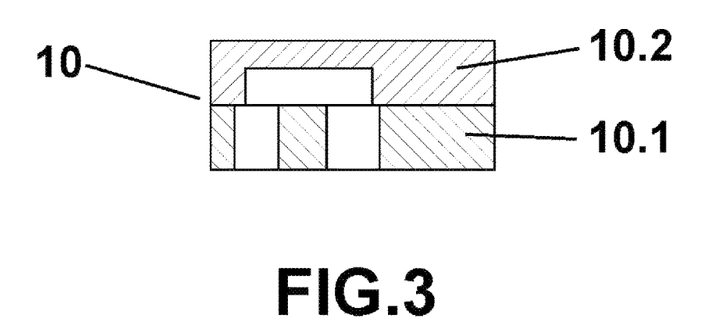
FIG. -3- shows a sectional view of the coupled ceramic disc.
Figure 4:
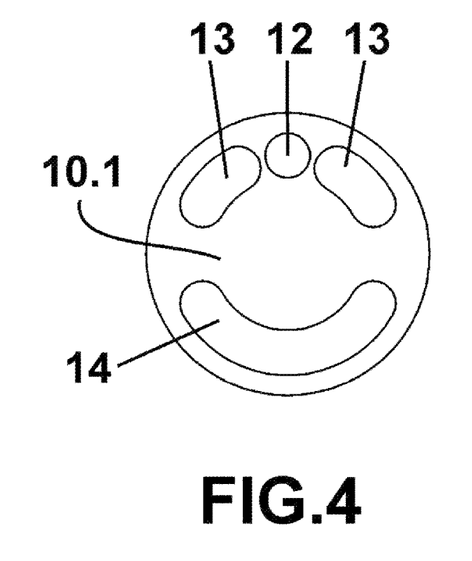
FIG. -4- shows a top view of a preferred development of the fixed part of the ceramic disc.

In a preferred development, the ceramic disc (10), comprises a fixed part (10.1) and a rotating part (10.2), as its coupling shows in FIG. 3, the fixed part (10.1) being configured by several straight through-openings configured around the external diameter of the same, positioning, in the top semicircle, an opening (12) intended for discharging and positioned on either side an elongated opening (13), one intended for the outlet of the shower hose (9) and the other for the shower column/head (8), positioning, on the bottom semicircle, an elongated opening (14) of a larger size that takes up a large part of the semicircular surface, intended for the inflow of water, FIG. 4 showing the straight through-openings (12,13 and 14) of the fixed part (10.1) of the ceramic disc (10).

Figure 5:
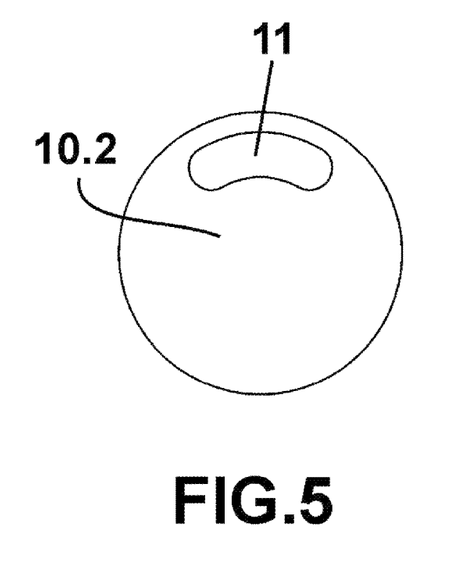
FIG. -5- shows a top view of a preferred development of the rotating part of the ceramic disc.

The rotating part (10.2) comprises an elongated cavity (11), configured around the external diameter of the same, positioned in the top semicircle, intended for controlling water flow in conjunction with the straight through-openings (12, 13 and 14) of the fixed part (10.1), FIG. 5 showing the positioning of the elongated cavity (11) of the rotating part (10.2) of the ceramic disc (10).

Figure 6:
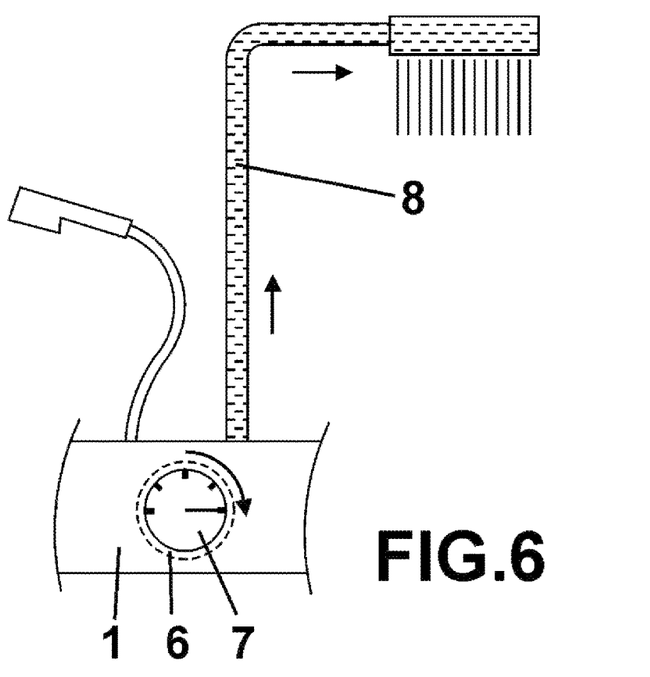
FIG. -6- shows a schematic view of the distributing, opening and closing device for taps, with the actuating control in the opening function towards the shower column/head.
Figure 7:
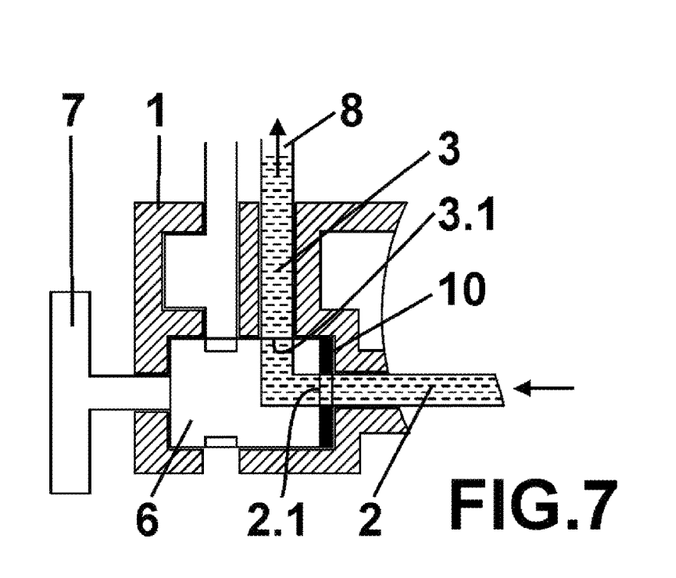
FIG. -7- shows a schematic sectional view of the distributing, opening and closing device for taps, in the opening function towards the shower column/head.
Figure 8:
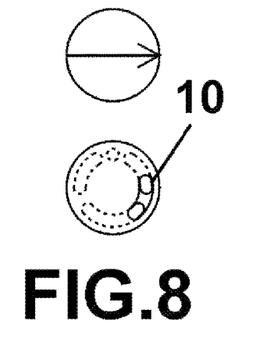
FIG. -8- shows a schematic view of the direction of rotation of the actuating control in the opening function and a detailed view of the positioning of the ceramic discs.

Opening towards the shower column/head: by rotating the actuating control (7) in a direction, according to the position marked on the distributing, opening and closing device for taps (1) or actuating control (7), the controlled water flow gradually enters the chamber (2) of the distributing, opening and closing device for taps (1) connecting to the inlet pipe (2.1) of the water regulator (6), being directly diverted, via the outlet pipe (3.1) to the chamber (3), towards the shower column/head (8) as shown in FIGS. 6 and 7, FIG. 8 showing details of the positioning of the ceramic discs in the opening position towards the shower column/head.

Figures 15, 17:
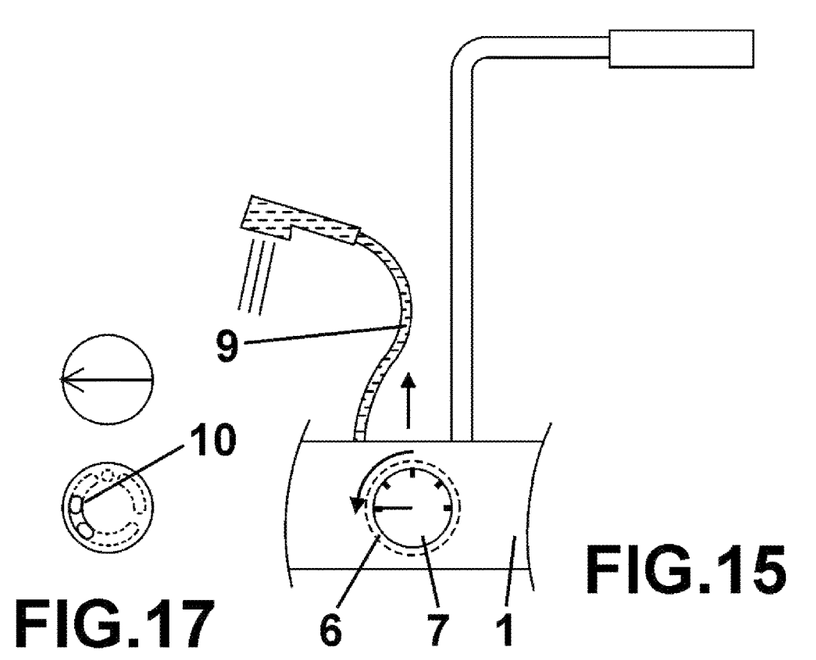
FIG. -15- shows a schematic view of the distributing, opening and closing device for taps, with the actuating control in the opening function towards the shower hose.
FIG. -17- shows a schematic view of the direction of rotation of the actuating control in the opening function and a detailed view of the positioning of the ceramic discs.
Figure 16:
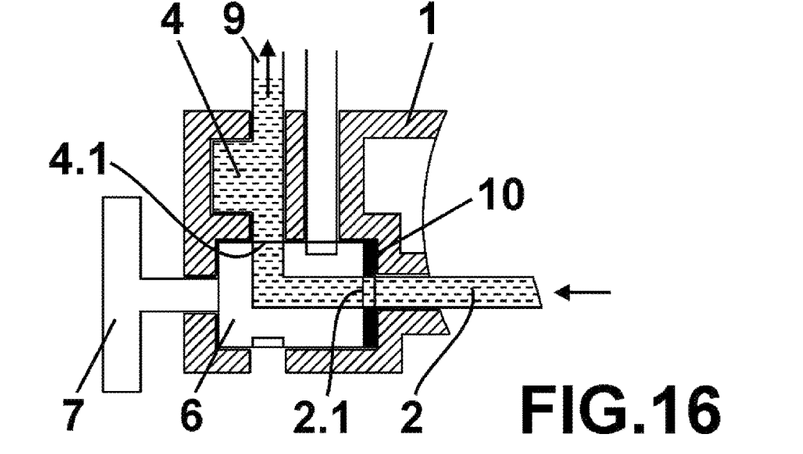
FIG. -16- shows a schematic sectional view of the distributing, opening and closing device for taps, in the opening function towards the shower hose.

Opening towards the shower hose: by rotating the actuating control (7) in the opposite direction, according to the position marked on the distributing, opening and closing device for taps (1) or actuating control (7), the controlled water flow gradually enters the chamber (2) of the distributing, opening and closing device for taps (1) connecting to the inlet pipe (2.1) of the water regulator (6), being directly diverted, via the outlet pipe (4.1) to the chamber (4), towards the shower hose (9) as shown in FIGS. 15 and 16, FIG. 17 showing details of the positioning of the ceramic discs in the opening position towards the shower hose.

Intermediate closing: by rotating the actuating control (7) according to the position marked on the distributing, opening and closing device for taps (1) or actuating control (7), the controlled water flow inlet (2) is cut off, with the water being retained in the shower column/head (8) or shower hose (9).

Figures 9, 11:
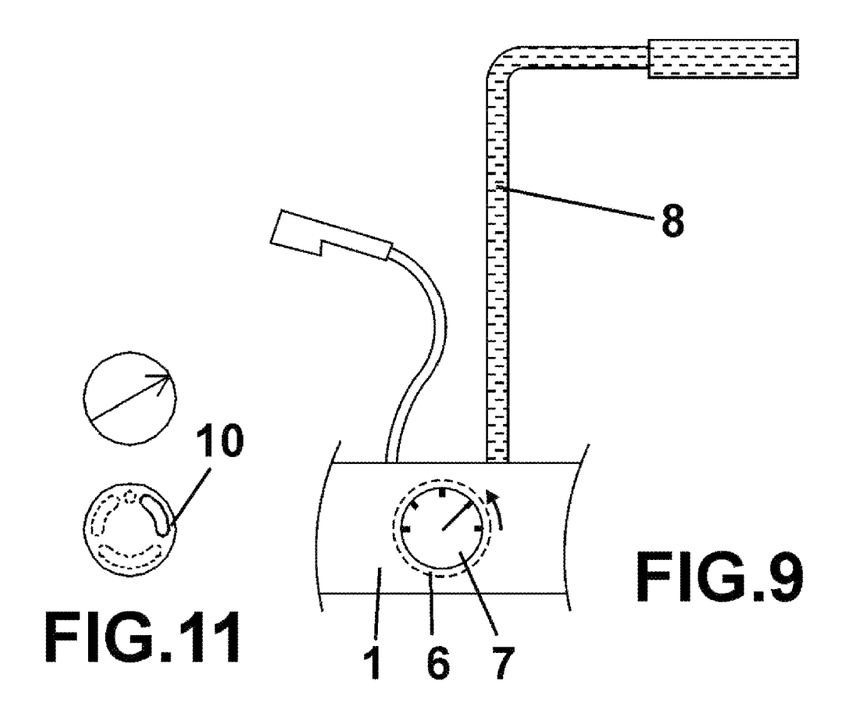
FIG. -9- shows a schematic view of the distributing, opening and closing device for taps, with the actuating control in the intermediate closing function of the shower column/head.
FIG. -11- shows a schematic view of the direction of rotation of the actuating control in the intermediate closing function and a detailed view of the positioning of the ceramic discs.
Figure 10:
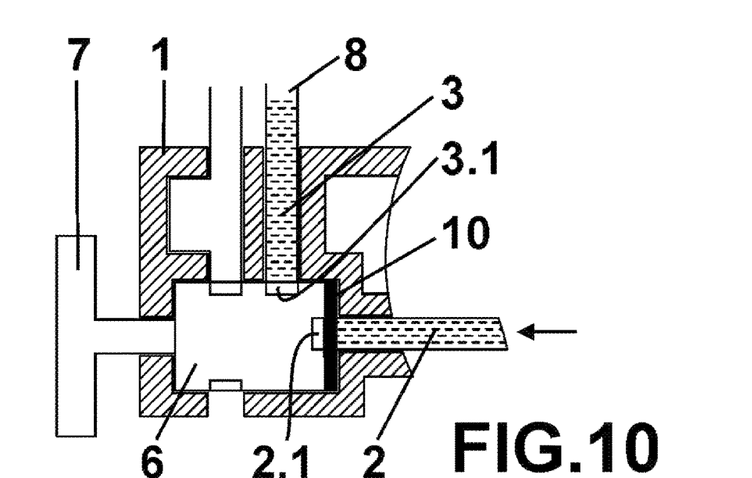
FIG. -10- shows a schematic sectional view of the distributing, opening and closing device for taps, in the intermediate closing function of the shower column/head.

FIGS. 9 and 10 show the positioning of the actuating control (7) in the intermediate closing function, corresponding to cutting off the inflow of water in the shower column/head, keeping the water retained, with FIG. 11 showing in detail the positioning of the ceramic discs in the position of intermediate closing towards the shower column/head.

Figures 18, 20:
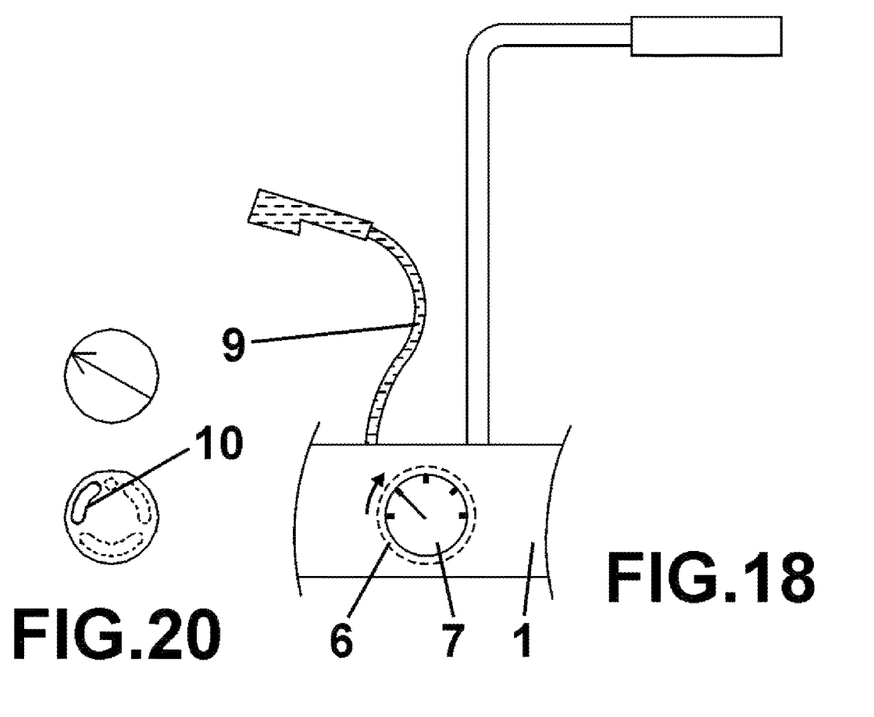
FIG. -18- shows a schematic view of the distributing, opening and closing device for taps, with the actuating control in the intermediate closing function of the shower hose.
FIG. -20- shows a schematic view of the direction of rotation of the actuating control in the intermediate closing function and a detailed view of the positioning of the ceramic discs.
Figure 19:
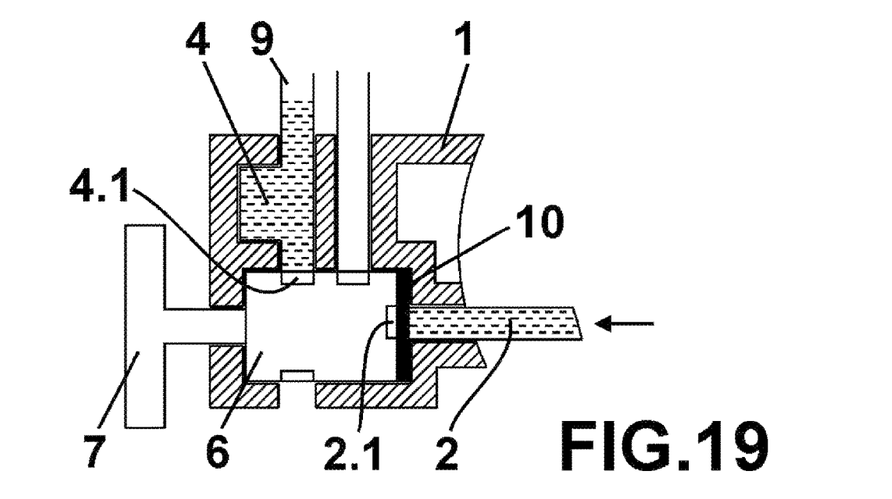
FIG. -19- shows a schematic sectional view of the distributing, opening and closing device for taps, in the intermediate closing function of the shower hose.

Likewise FIGS. 18 and 19 show the positioning of the actuating control (7) in the intermediate closing function, corresponding to cutting off the inflow of water in the shower hose, keeping the water retained, with FIG. 20 showing in detail the positioning of the ceramic discs in the position of intermediate closing towards the shower hose.

Closing/discharging: by rotating the actuating control (7) to the start position, according to the position marked on the distributing, opening and closing device for taps (1) or actuating control (7), the water retained in the shower column/head (8) or shower hose (9) is discharged by gravity via the discharge pipe (5.1) of the water regulator (6), coming out through an opening (5), incorporated in the distributing, opening and closing device for taps (1).

Figures 12, 14:
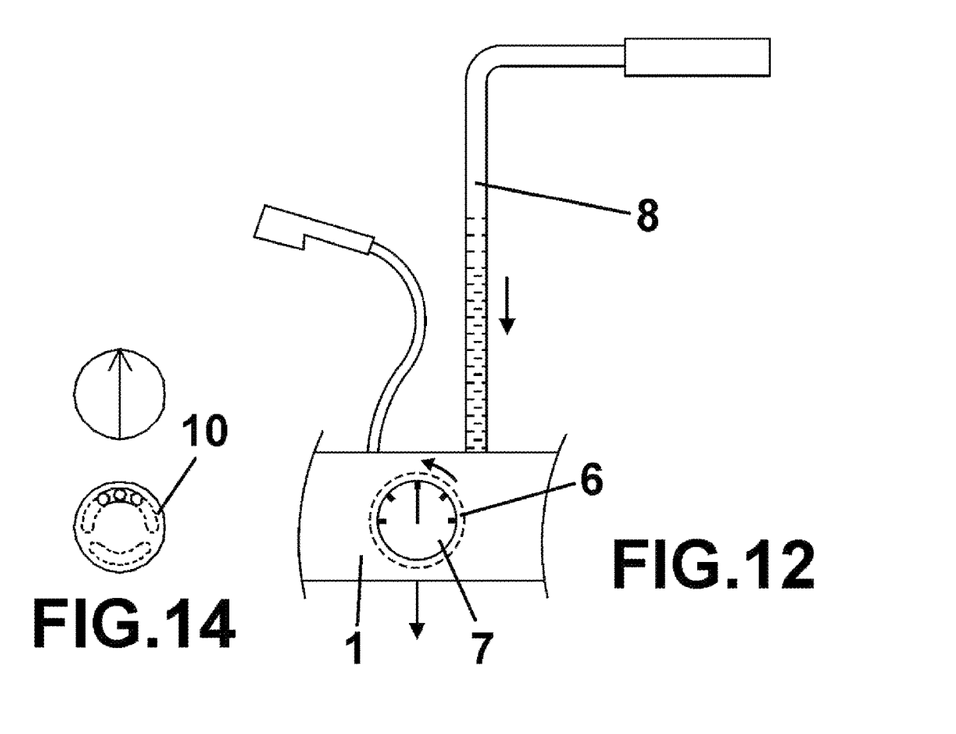
FIG. -12- shows a schematic view of the distributing, opening and closing device for taps, with the actuating control in the closing/discharging function of the shower column and shower head pipe.
FIG. -14- shows a schematic view of the direction of rotation of the actuating control in closing/discharging function and a detailed view of the positioning of the ceramic discs.
Figure 13:
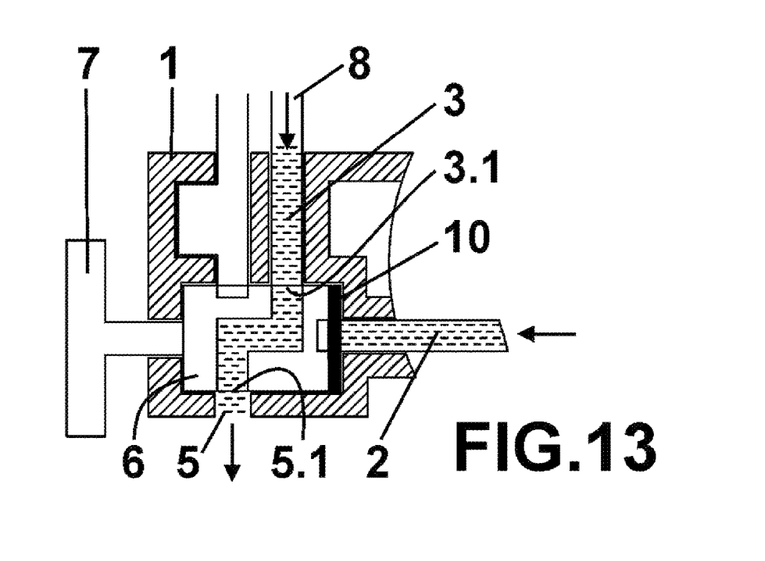
FIG. -13- shows a schematic sectional view of the distributing, opening and closing device for taps, in the closing/discharging function of the shower column and shower head pipe.

FIGS. 12 and 13 show the positioning of the actuating control (7) in the closing/discharging function, corresponding to the final discharging of the water retained in the shower column and shower head pipe, directing the water outwards, by gravity, with FIG. 14 showing the positioning of the ceramic discs in the position of closing/final discharging of the flow of water from the shower column/head, eliminating the possibility of microorganisms and legionella bacteria developing and proliferating.

Figures 21, 23:
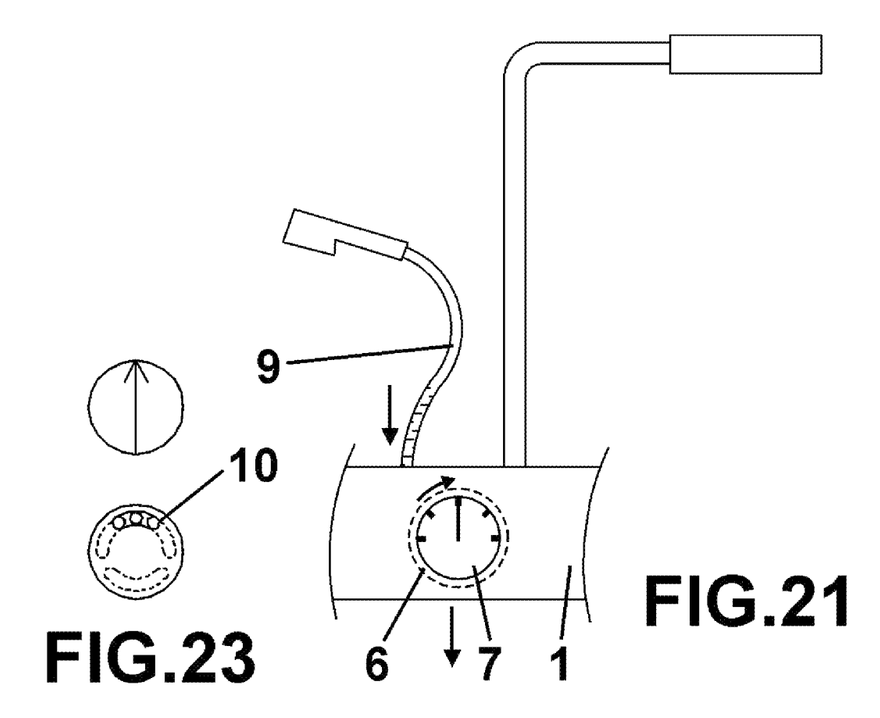
FIG. -21- shows a schematic view of the distributing, opening and closing device for taps, with the actuating control in the closing/discharging function of the shower hose.
FIG. -23- shows a schematic view of the direction of rotation of the actuating control in the closing/discharging function and a detailed view of the positioning of the ceramic discs.
Figure 22:
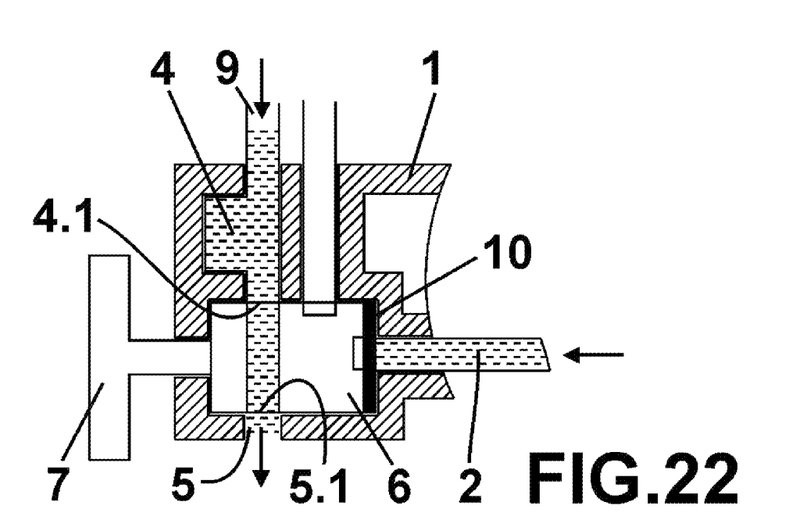
FIG. -22- shows a schematic sectional view of the distributing, opening and closing device for taps in the intermediate closing function of the shower hose.

Likewise FIGS. 21 and 22 show the positioning of the actuating control (7) in the closing/discharging function, corresponding to the final discharging of the water retained in the shower column and shower head pipe, directing the water outwards, by gravity, with FIG. 14 showing the positioning of the ceramic discs in the position of closing/final discharging of the flow of water from the shower column/head, eliminating the possibility of microorganisms and legionella bacteria developing and proliferating.

Figure 2:
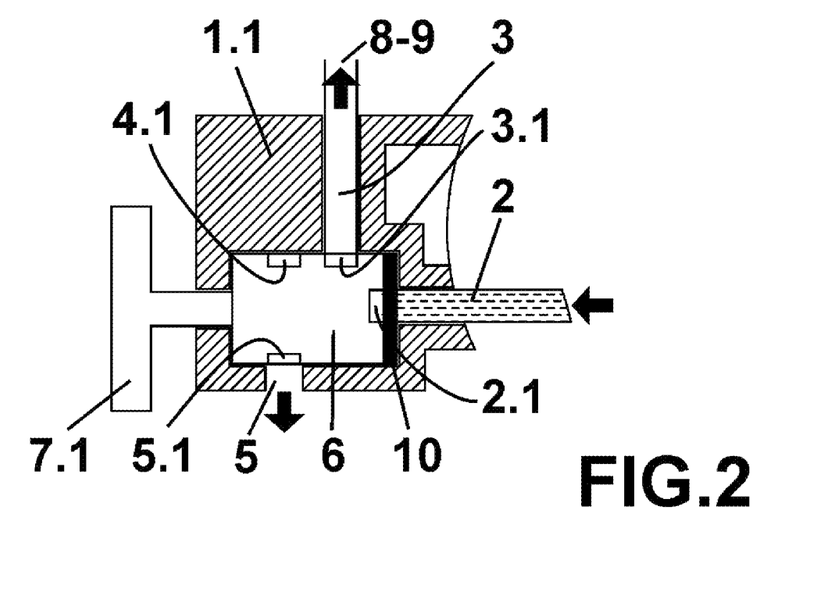
FIG. -2- shows a schematic sectional view of the distributing, opening and closing device for taps, in an alternative embodiment.

The water regulator (6) can be perfectly fitted on a distributing, opening and closing device for taps (1.1) configured with a single outlet chamber towards a shower column/head (8) or towards a shower hose (9), without altering operation and, in this case, being regulated by an actuating control (7.1.), regulating the functions of opening, closing, intermediate closing and closing/discharging in a single mechanism, as shown in FIG. 2, and as an alternative embodiment, with an inlet chamber (2), an outlet chamber (3) and a discharge opening (5), and a water regulator (6) with opening, intermediate closing and closing/discharging in a single mechanism, and connected to chambers (2,3 and 5) of the distributing device (1.1), being regulated via an actuating control (7.1) with several positions, to divert water, according to the actuating rotation, to the corresponding chamber or discharge.

The invention claimed is:

1. Distributing, opening and closing device for taps, characterised in that said device comprises an inlet chamber (2), a shower hose (9), a shower column/head (8), a first outlet chamber (3) to the shower column/head (8) or to the shower hose (9), a second outlet chamber (4) to the shower hose (9) or to the shower column/head (8), a discharge opening (5) located within said device and a water regulator (6) located within said device which incorporates the functions of opening, intermediate closing and closing/discharging the shower hose (9) or the shower column/head (8) in one single mechanism, said water regulator (6) being connected to the inlet or outlet chambers (2,3 and 4) of the distributing device, and being regulated via an actuating control (7-7.1) with several positions, depending on the actuating rotation, to divert the water to the corresponding outlet chamber (3-4) or discharge opening (5) of both, wherein the water regulator (6) comprises an inlet pipe (2.1), an outlet pipe (3.1) to the shower column/head or shower hose, an outlet pipe (4.1) to the shower hose or shower column/head, a discharge pipe (5.1) and ceramic discs (10) and wherein the ceramic discs (10) comprises a fixed part (10.1) and a rotating part (10.2), the fixed part (10.1) being configured by several straight through-openings configured around the external diameter of the same, positioning, in the top semicircle, an opening (12) intended for discharging and on either side, an elongated opening (13), one intended for the outlet of the flexible hose (9) and the other for the shower column/head (8), positioning in the bottom semicircle an elongated opening (14) of larger dimensions, taking up a large part of the semicircular surface, intended for the inlet of water.

2. Distributing, opening and closing device for taps, according to claim 1, wherein the rotating part (10.2) comprises an elongated cavity (11), configured around the external diameter of the same, positioned in the top semicircle, intended for controlling the water flow, in conjunction with openings (12, 13 and 14) of the fixed part (10.1).

3. Distributing, opening and closing device for taps, according to claim 1, wherein when the actuating control (7) is positioned for the function of opening the outlet pipe to the shower column/head (8) or the shower hose (9), the inlet chamber (2) is connected to the outlet chamber (3) via the inlet pipe (2.1) and outlet pipe (3.1) of the water regulator (6).

4. Distributing, opening and closing device for taps, according to claim 1, wherein when the actuating control (7) is positioned at the function of intermediate closing of the outlet pipe to the shower column/head (8) or the shower hose (9), the connection between the inlet chamber (2) and the outlet chamber (3) is cut off.

5. Distributing, opening and closing device for taps, according to claim 1, wherein when the actuating control (7) is positioned at the function of closing/discharging the outlet pipe to the shower column/head (8), the discharge pipe (5.1) of the water regulator (6) is opened so that the water retained in the shower column/head (8) and/or shower hose (9) can flow out by gravity through a discharge opening (5).

6. Distributing, opening and closing device for taps, according to claim 1, wherein when the actuating control (7) is positioned at the function of opening the outlet pipe to the shower hose (9) or to the shower column/head (8), the inlet chamber (2) is connected to the outlet chamber (4) via the inlet pipe (2.1) and outlet pipe (4.1) of the water regulator (6).

7. Distributing, opening and closing device for taps, according to claim 1, wherein when the actuating control (7) is positioned at the function of intermediate closing of the outlet pipe to the shower hose (9) or to the shower column/head (8), the connection between the inlet chamber (2) and the outlet chamber (4) is cut off.

8. Distributing, opening and closing device for taps, according to claim 1, wherein when the actuating control (7) is positioned at the function of closing/discharging the outlet pipe to the shower hose (9), the discharge pipe (5.1) of the water regulator (6) is opened so that the water retained in the shower column/head (8) and/or the shower hose (9) can flow out by gravity through a discharge opening (5).

9. Distributing, opening and closing device for taps, according to claim 1, wherein the water regulator (6) can be fitted on a distributing device (1.1), configured by a single outlet chamber to a shower column/head (8) or to a shower hose (9), being regulated by an actuating control (7.1.) with three positions.

10. Distributing, opening and closing device for taps, according to claim 1, wherein the inlet chamber (2) is only a single inlet chamber.

* * * * *